(12) United States Patent
Herbers et al.

(10) Patent No.: US 10,960,809 B2
(45) Date of Patent: Mar. 30, 2021

(54) ADJUSTMENT UNIT FOR THE BEAM LEVEL OF A LIGHT UNIT IN A HEADLIGHT

(71) Applicant: Hella GmbH & Co. KGaA, Lippstadt (DE)

(72) Inventors: Thomas Herbers, Lippstadt (DE); Helmut Jakobsmeyer, Paderborn (DE); Giuseppe Mattina, Lippstadt (DE); Gerd Pawliczek, Erwitte (DE); Hans-Christian Schall, Bad Lippspringe (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/577,651

(22) Filed: Sep. 20, 2019

(65) Prior Publication Data
US 2020/0010013 A1    Jan. 9, 2020

Related U.S. Application Data

(63) Continuation of application No. PCT/EP2017/056517, filed on Mar. 20, 2017.

(51) Int. Cl.
*B60Q 1/068* (2006.01)
*B60Q 1/04* (2006.01)

(52) U.S. Cl.
CPC .......... *B60Q 1/0683* (2013.01); *B60Q 1/045* (2013.01)

(58) Field of Classification Search
CPC .............................. B60Q 1/0683; B60Q 1/045
See application file for complete search history.

(56) References Cited

U.S. PATENT DOCUMENTS

| 5,951,157 A | 9/1999 | Shirai et al. |
| 6,050,712 A | 4/2000 | Burton |
| 6,132,073 A | 10/2000 | Akiyama et al. |
| 6,773,153 B2 * | 8/2004 | Burton ................ B60Q 1/0683 |
| | | 362/528 |

(Continued)

FOREIGN PATENT DOCUMENTS

| DE | 20204244 U1 | 6/2002 |
| WO | WO2013025176 A1 | 2/2013 |

OTHER PUBLICATIONS

International Search Report dated Nov. 9, 2017 in corresponding application PCT/EP2017/056517.

*Primary Examiner* — William N Harris
(74) *Attorney, Agent, or Firm* — Muncy, Geissler, Olds & Lowe, P.C.

(57) ABSTRACT

An adjustment unit for the mechanical adjustment of the beam level of at least one light unit of a headlight for a vehicle, having at least one shaft and a securing component, wherein the shaft is rotatable arranged at a housing of the headlight, wherein the shaft comprises or is coupled with a screw member, by means of which a rotary motion of the shaft can be caused in a shaft axis of the shaft in order to adjust the beam level of the at least one light unit, and wherein the securing component is provided, which prevents the screw member from an unwanted screwing. According to the invention, the securing component is configured to interact with the screw member, when the securing component is in a mounted state in which it is directly or indirectly attached to the housing.

11 Claims, 5 Drawing Sheets

(56) References Cited

U.S. PATENT DOCUMENTS

| | | | | |
|---|---|---|---|---|
| 7,153,012 B2* | 12/2006 | Sakurai | ................ | B60Q 1/0683 |
| | | | | 362/523 |
| 7,637,685 B2* | 12/2009 | Brott | ...................... | B60Q 1/076 |
| | | | | 362/515 |
| 7,824,087 B2* | 11/2010 | Gattone | ............... | B60Q 1/0683 |
| | | | | 362/523 |
| 8,033,700 B2* | 10/2011 | Gattone | ............... | B60Q 1/0683 |
| | | | | 362/515 |
| 2003/0174512 A1 | 9/2003 | Rohr | | |
| 2004/0090780 A1* | 5/2004 | Burton | ................. | B60Q 1/0683 |
| | | | | 362/273 |
| 2004/0240222 A1* | 12/2004 | Brazas | ................. | B60Q 1/0683 |
| | | | | 362/514 |
| 2011/0032716 A1* | 2/2011 | Burton | ................... | B60Q 1/068 |
| | | | | 362/460 |
| 2011/0085346 A1* | 4/2011 | Herbin | ................. | B60Q 1/0683 |
| | | | | 362/523 |
| 2014/0146550 A1* | 5/2014 | Leisse | ................. | B60Q 1/0433 |
| | | | | 362/460 |

\* cited by examiner

ADJUSTMENT UNIT FOR THE BEAM LEVEL OF A LIGHT UNIT IN A HEADLIGHT

This nonprovisional application is a continuation of International Application No. PCT/EP2017/056517, which was filed on Mar. 20, 2017, and which is herein incorporated by reference.

BACKGROUND OF THE INVENTION

Field of the Invention

The present invention relates to an adjustment unit for the mechanical adjustment of the beam level of at least one light unit of a headlight for a vehicle, comprising at least one shaft and a securing component, wherein the shaft is rotatable arranged at a housing of the headlight, wherein the shaft comprises or is coupled with a screw member, by means of which a rotary motion of the shaft can be caused in a shaft axis of the shaft in order to adjust the at least one light unit, and wherein the securing component prevents the screw member from an unwanted screwing.

Description of the Background Art

DE 202 04 244 U1, which corresponds to US 2003/0174512 discloses an adjustment unit for the mechanical adjustment of the beam level of at least one light unit of a headlight for a vehicle. The adjustment unit comprises a screw member, which is coupled to a shaft. When the screw member is rotated by means of a tool, the rotating shaft leads to a tilting of the light unit about an horizontal axis and thus to an adjustment of the beam level of the light unit. In order to prevent an unallowed adjustment of the light unit, e.g. after mounting the headlight to a vehicle and adjusting the beam level such that it is in alignment with the legal requirements, a cover element is pressed into the opening in which the screw member is arranged such that the screw member is covered and thus prevented from being screwed by a tool. The cover element is snapped into a receiver; thus, the cover element forms a securing component that cannot be removed after being mounted to the receiver such that a tool cannot be inserted into the screw member anymore.

Unfortunately, when it is possible to access the main adjustment shaft from outside, it might be possible to rotate the shaft, even though the cover element is arranged at the housing. This leads to the possibility of an unallowed maladjustment.

Another disadvantage is given by the fact that it is not possible to see whether the adjustment unit has been manipulated or not. At the same time, it should be possible for the original equipment manufacturer to use an exchange element, after a subsequent adjustment has been performed e.g. within a service of the manufacturer. By using an exchange element, the original condition of the adjustment unit can be restored. Accordingly, it is desirable that a destroyable exchange element can be provided, which is only available by the original equipment manufacturer.

SUMMARY OF THE INVENTION

It is therefore an object of the present invention to provide an adjustment unit which can be locked against an unwanted adjustment of the light unit and which is designed so that a manipulation is visible from the outside. In particular, it is an objective to provide at least one exchangeable element to restore the adjustment unit in the original condition. Further, it is an object of the invention to provide a headlight with such an improved adjustment unit.

The invention discloses the technical teaching that the securing component is configured to interact with the screw member in a mounted position of the securing component in which the securing component is directly or indirectly attached to the housing.

The main idea of the invention is providing a securing component which serves as a cover element for covering the screw member on the one hand and which interacts with the screw member on the other hand in such a way that a rotation of the screw member is prohibited. This means that—in a mounted position in which the securing component is attached to the housing—the securing component provides a positive fit with the screw member such that the screw member can no longer be rotated. Moreover, the securing component forms a positive fit with the housing in a direct or indirect way. The terms "direct attachment" and "direct fit" mean that there is a direct attachment or fit without any intermediate members in between the two parts that are attached or fitted to each other. The terms "indirect attachment" and "indirect fit" however mean that an intermediate member is provided between the two parts, e.g. between the securing component and the housing and the securing, wherein the attachment or positive fit, respectively, is realized by the help of the intermediate member. Further, according to this disclosure, the meaning of the word "housing" includes not only a housing itself being produced as a single piece, but also a housing with an intermediate member which is attached to or part of the housing.

By the inventive design of the securing component it is achieved that an unwanted screwing of the shaft and thus an unwanted adjustment of the light unit is prohibited. I.e. by the help of the securing component, the screw member and the shaft are locked against a rotational movement. In particular, in case the screw member and the shaft are integrally built, the locking of the screw member leads to a locking of the shaft for adjusting the light unit. At the same time, the additional advantage of covering the screw member is achieved, in particular in case the securing component being arranged at the housing in a position above the screw member such that the screw member is hidden below the securing component. Because of being hidden by the securing component, there is no access to the screw member. I.e., a tool cannot be inserted into the screw member for performing a rotational movement of the screw member and the shaft.

The securing component can cover the screw member and/or comprises a securing section, wherein the securing section is engaged with the screw member, when the securing component is at least indirectly attached to the housing. The engagement between the securing section of the securing component and the screw member forms a positive fit. Furthermore, the securing component forms a positive fit with the housing. Thus, it is achieved that the screw member is positive fitted with the housing via the securing component.

The screw member can comprise a wrench insert into which a wrench can be inserted for rotating the screw member, wherein the securing component is engaged with the wrench insert, when the securing component is directly or indirectly attached to the housing. The wrench insert forms for example a hexagonal recess, a torx or the like, wherein the securing section has a shape that is formed at least partly as a negative of the wrench insert.

The securing component can comprise a holder and the screw member comprises a counter holder, wherein the holder is engaged with the counter holder in the mounted position of the securing component. In addition to the positive fit effect, the interaction between the holder and the counter holder results in a self-retaining connection of the securing component with the screw member. In particular, according to this embodiment the connection between the securing component and the screw member cannot be released by simply pulling the securing component out of the screw member.

According to another advantageous embodiment of the invention, the securing component comprises a toothing being engageable with a counter toothing which is provided directly or indirectly at the housing. The toothing serves as a kind of gear ring which is engaged with an inner gear structure forming the counter toothing. When the toothing is engaged with the counter toothing, a rotation of the securing component and thus the screw member is prohibited. Preferably, the toothing has a small tooth pitch such that it is possible to press the securing component into the reception structure in various rotating positions in small angle steps.

A receiver is provided and attached to the housing, wherein the counter toothing is formed in the receiver. In general, the receiver can be designed and configured to receive the securing component. The original equipment manufacturer can decide whether the adjustment unit should be secured with a securing component or not. If not, the receiver will not be attached to the housing, and the screw member and the shaft are received in a conventional way.

In case the manufacturer wants to apply the securing component to the adjustment unit, the manufacturer can first attach the receiver to the housing and subsequently after adjusting the light units, the securing component is attached to the receiver.

The screw member can be connected to the shaft via a coupler, wherein the securing component extends into or through an opening of the coupler and is engaged with the shaft in the mounted position of the securing component in which the securing component is attached to the housing and covers the screw member. According to this embodiment, the securing component comprises a cover section for covering the screw member and the securing component comprises a fastening arm for untouchable fastening the securing component to the housing. As a result, it is not possible to rotate the securing together with the screw member, because the interaction of the securing component with the shaft forms a positive fit in order to prevent the shaft from an unwanted rotation independently from the screw member. For example, the securing component may comprise a pin or shaft-structure, which can be inserted into an opening at the top end of the shaft.

According to another embodiment of the invention, the securing component forms a crown with a disc body for covering the screw member and with prongs formed on the outer circumference of the disc body. In the mounted position of the securing component, the disc body is arranged such that it covers the screw member. At the same time, the prongs are snapped behind or grip into a rim shape provided directly or indirectly at the housing. According to this embodiment, the securing component serves as a kind of snap or lock element, which can snap or grip into a reception geometry formed by the rim shape such that it is impossible to remove the securing component from the housing. Moreover, the screw member comprises a number of teeth and the disc body comprises a number of holes. In the mounted position, the multiple teeth extend into the multiple holes such that the screw member is locked an unwanted rotation of the screw member is prohibited.

Further, the invention is related to a headlight for a vehicle comprising a housing, at least one light unit and an inventive adjustment unit for the mechanical adjustment of the beam level of the at least one light unit, wherein the adjustment unit is configured as described above. With regard to preferred embodiments of the headlight, it is referred to the description of the preferred embodiments of the inventive adjustment unit which apply correspondingly.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
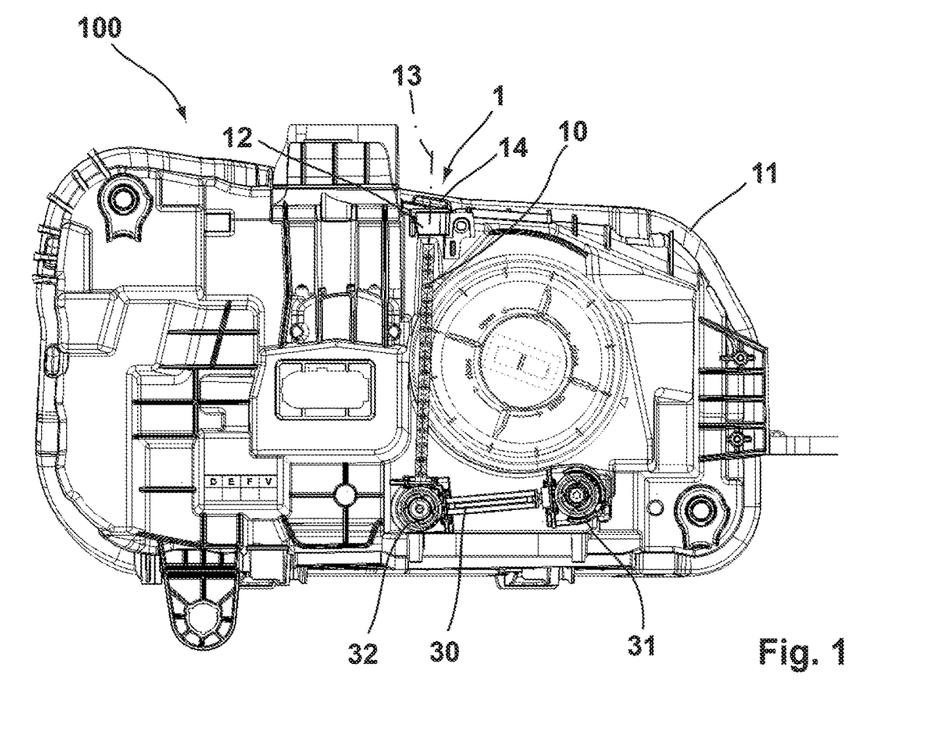
FIG. 1 shows a back-side view of a housing of a headlight of a vehicle with an adjustment unit which is arranged at the housing.

FIG. 1 shows a back-side view of a headlight 100 with an adjustment unit 1 attached to the housing 11 of the headlight 100. The adjustment unit 1 comprises a main shaft 10 which interacts with a transmission shaft 30 by means of a transmission gear 32. The transmission shaft 30 is coupled to a light unit inside the housing 11 of the headlight 100, e.g. via another gear 31 and optionally other intermediate shafts/gears. When the shaft 10 is rotated, this rotational movement is transferred into a rotational movement of the transmission shaft 30 and finally to a tilting movement of the light unit such that the beam level of the light unit is adjusted.

The shaft 10 extends along a vertically oriented shaft axis 13. At an upper end portion of the shaft axis 13, a screw member 12 is arranged, which can be selectively covered by a securing component 14.

Figure 2:
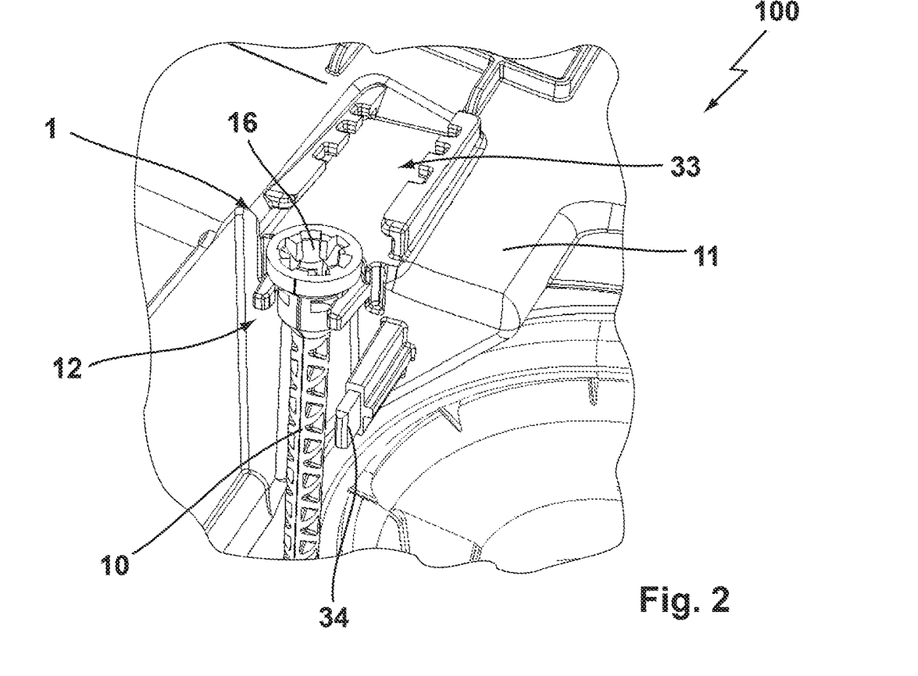
FIG. 2 shows a detailed view of an upper part of the shaft of the adjustment unit according to FIG. 1.

FIG. 2 shows a more detailed view of the upper end of the shaft 10 of the adjustment unit 1. The shaft 10 is integrally built with the screw member 12. The screw member 12 comprises a wrench insert 16 at its upper end into which a tool can be inserted for rotating the shaft 10 and thus adjust the beam level of the light unit. The shaft 10 and in particular the screw member 12 is hold by a holding plate 33 which is attached to the housing 11 of the headlight 100. In this state of the adjustment unit 1, the screw member 12 and in particular the wrench insert 16 is accessible from outside of the housing 11 such that a tool can be inserted and rotated in order to activate the adjustment unit 1 such that the shaft 10 is rotated.

Figure 3:
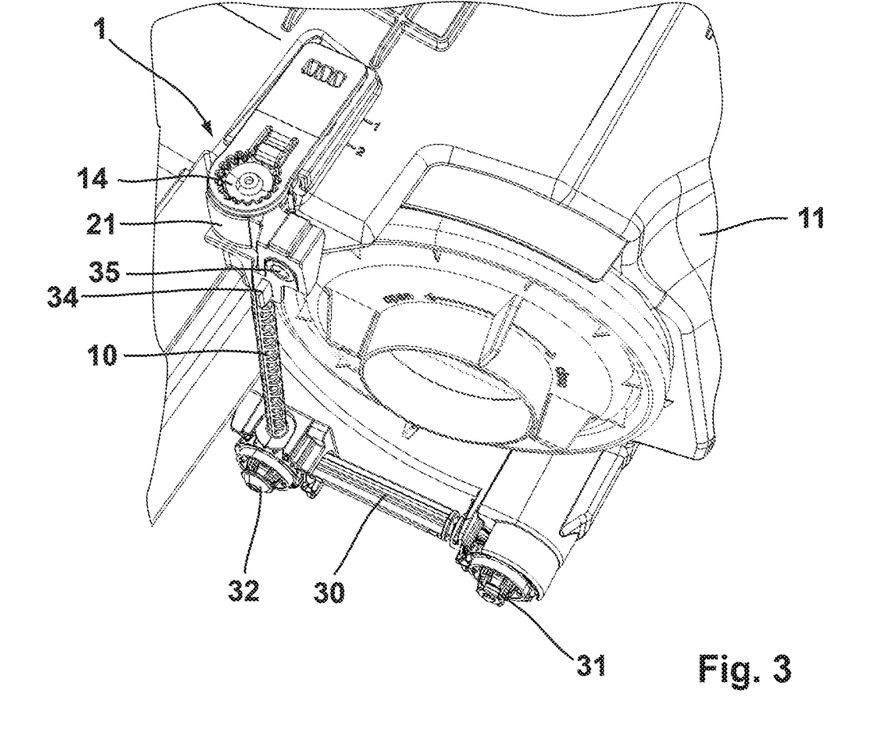
FIG. 3 shows another detailed view of the adjustment unit according to FIG. 1 comprising a receiver for receiving the securing component.

FIG. 3 shows the arrangement of the adjustment unit 1 according to FIG. 2 with the difference that a receiver 21 is attached to the holding plate 33, and the receiver 21 is fixed to the housing 11 with a screw 35. Moreover, the connector 34, which is also shown in FIG. 2, protrudes through an opening in the receiver 21 and can be deformed e.g. by a hot riveting process, in order to obtain an undetachable connection of the receiver 21 with the housing 11.

The screw member 12 is received within the receiver 21. On the top of the screw member 12 a securing component 14 is arranged in order to prohibit a further screwing of the screw member 12, and thus to prohibit the shaft 10 from being further rotated. Accordingly, it is not possible to rotate the shaft 10 or to rotate the transmission shaft 30 arranged in between the gear 31 and the transmission gear 32, respectively. In other words, when a user tries to activate the adjustment unit 1 for manipulating the beam level adjustment, it is not possible to rotate the shaft 10 directly, because the securing component 14 interacts with the screw member 12 received within the receiver 21 and interlocks the screw member 12 with the receiver 21 and thus (indirectly) with the housing 11.

Figure 4:
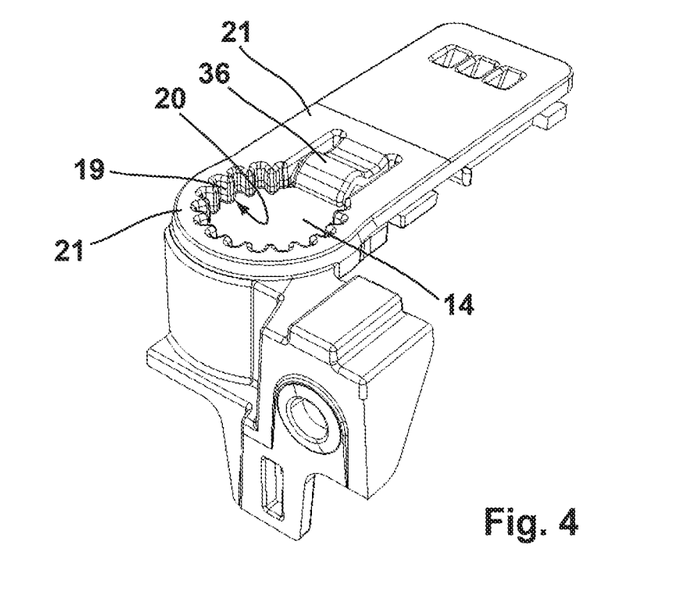
FIG. 4 shows an arrangement of the receiver with the securing component in a more detailed view.

FIG. 4 shows a detailed view of the receiver 21 with an inserted securing component 14 within the receiver 21. The securing component 14 comprises a toothing 19, which interacts with a counter toothing 20 provided at an inner surface of the receiver 21 defining an opening of the receiver 21 in which the securing component 14 is received. The interaction of the toothing 19 and the counter toothing 20 results in a positive fit such that it is not possible to rotate the securing component 14 relative to the receiver 21. In order to safely retain the securing component 14 within the opening of the receiver 21, a clip 36 is integrally built from the receiver 21 and impinges the securing component 14 in axial direction towards its receiving position in the receiver 21.

Figure 5:
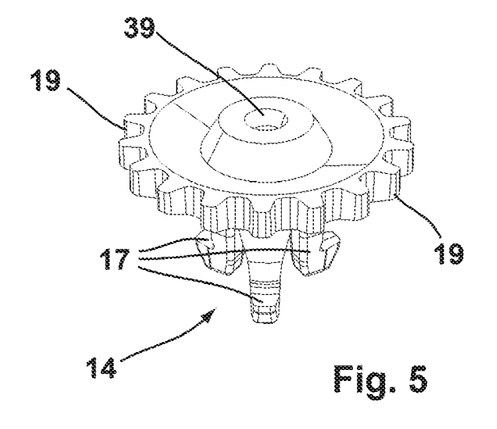
FIG. 5 shows a first perspective view of the securing component.
Figure 6:
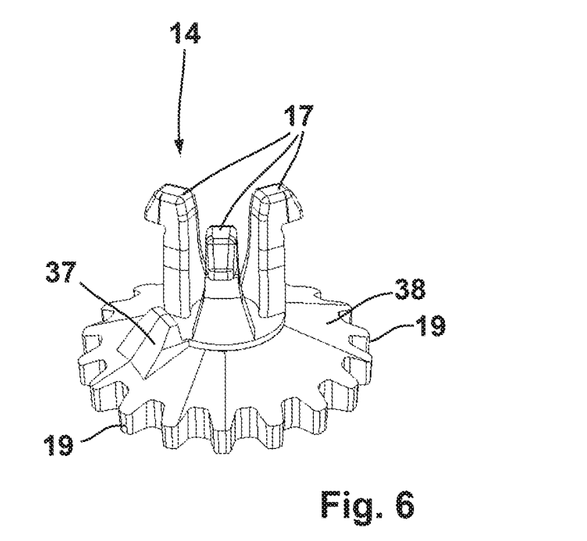
FIG. 6 shows a second perspective view of the securing component.
Figure 7:
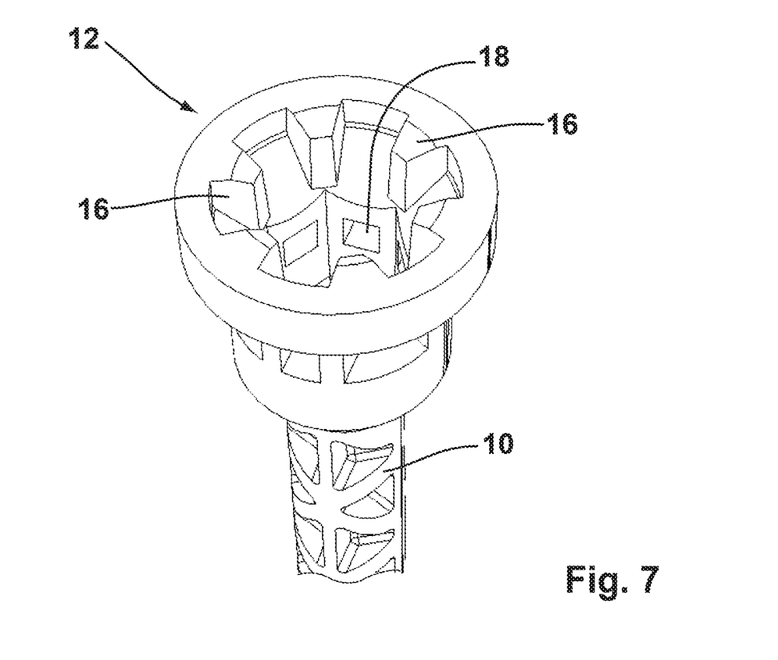
FIG. 7 shows a detailed view of a screw member integrally built with the shaft.

FIG. 5 and FIG. 6 show different perspective views of the securing component 14, which is configured to be received within the receiver 21. In order to couple the securing component to the screw member 14, the securing component 14 comprises holder 17 which serve as a kind of snap-fit elements, which can snap into corresponding counter holder 18 provided at the screw member 12, here in the form of recesses, as shown in FIG. 7. The main body of the securing component 14 has a disc-like shape with a toothing 19 at the outer circumference. The toothing 19 leads to a positive fit with the correspondingly toothed receiver 21 according to FIG. 3. At the bottom side of the main body of the securing component 14, a notch 37 is provided which interacts and in particular interlocks with the wrench insert 16 according to FIG. 7. The screw member 12 according to FIG. 7 is integrally built with the shaft 10. For adapting the shape of the main body of the securing component 12 to the contour of the wrench insert 16 of the screw member 12, the securing component 14 has a tapered shaped bottom 38, on which the notch 37 is arranged.

On the top side of the securing component 14, an opening 39 is provided which allows a handling tool to be inserted such that the securing component 14 can be handled with a handling tool.

Figure 8:
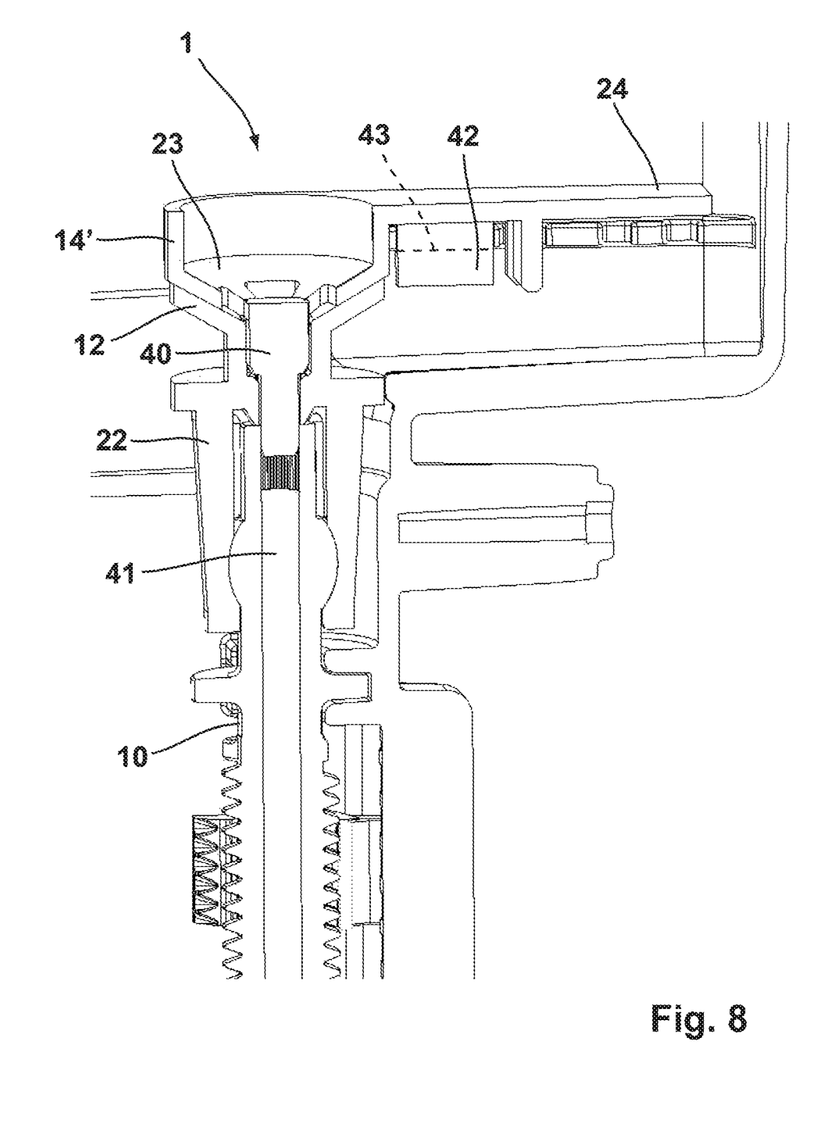
FIG. 8 shows a cross sectioned view of another embodiment of the adjustment unit with a securing component.

FIG. 8 shows another embodiment of the adjustment unit 1 attached to the housing 11 with the shaft 10, wherein the shaft 10 is coupled to the screw member 12 via a coupler 22. The coupler 22 connects the screw member 12 to the shaft 10 in such a manner that a torque between the screw member 12 and the shaft 10 can only be transmitted up to a pre-determined upper value. In case the torque exceeding this upper value, the coupler 22 slips through and a rotary movement of the screw member 12 is not transmitted to the shaft 10. At the same time, in case the screw member 12 would be secured with the securing component as known from the prior art, it would be possible to directly rotate the shaft 10 with a torque which is introduced into the shaft 10. In this case the coupler 22 would slip through in the same way.

In order to prevent a rotation of the screw member 12 as well as the shaft 10 with the securing component 14', the securing component 14' comprises a protrusion 40, which extends into the coupler 22 and is in direct engagement with the shaft 10 in the mounted position of the securing component 14' in which the securing component 14' is arranged at the housing 11 as shown in FIG. 8. More concrete, the protrusion 40 extends into a recess 41 of the shaft 10, wherein in rotary direction the protrusion 40' is positive fitted to the inner surface of the recess 41 of the shaft 10. Accordingly, a torque is transmittable between the protrusion 40 and the shaft 10. As a result, the protrusion 40' prohibits the shaft 10 from being rotated independent from the screw member 12.

For a safe securing of the securing component 14' to the housing 11, the securing component 14' comprises a cover section 23 and a fastening arm 24. The fastening arm 24 comprises a clip element 42 for forming a snap-fit connection with the housing 11. The clip element 42 is covered by the fastening arm 24, such that—once the securing component 14' being arranged to the housing 11—it is not possible to remove the securing component 14', because it is impossible to lose the clip element 42 from the form fitting edge 43 of the housing 11 (at least without causing serious damage to the adjustment unit 1 such that the attempt of manipulation of the adjustment unit 1 could be proven).

Figure 9:
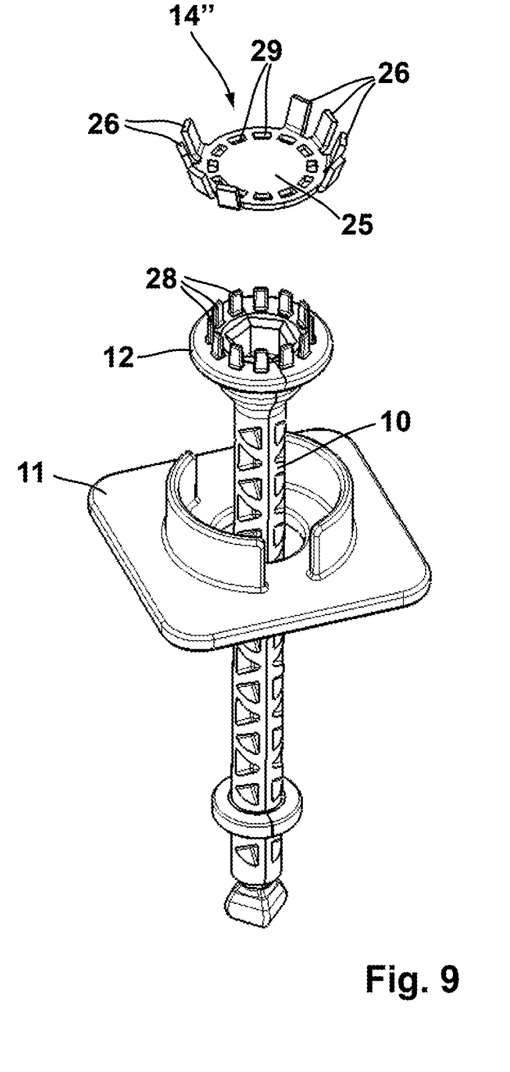
FIG. 9 shows yet another embodiment of an adjustment unit with a securing component and in a detached state and FIG. 10 shows the embodiment according to FIG. 9 with a securing component attached to the adjustment unit.
Figure 10:
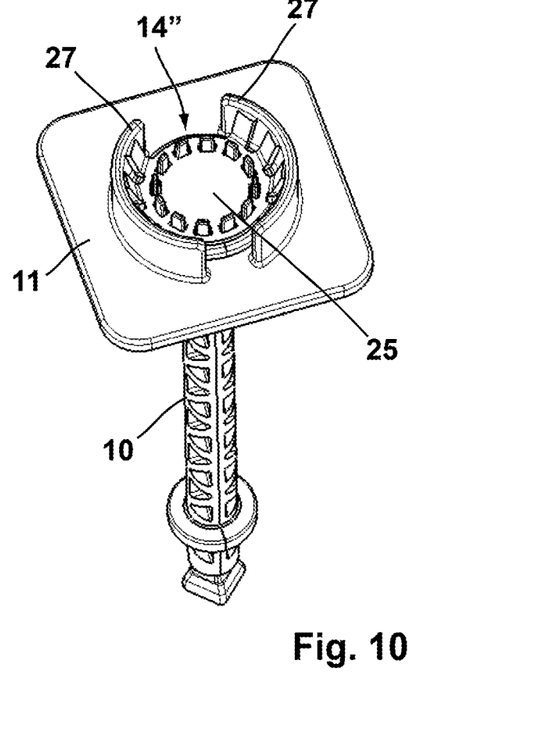

In FIG. 9 and FIG. 10 a third embodiment of the securing component 14" is shown as a part of the adjustment unit as shown in FIG. 1. A part of the housing 11 is shown in form of a plate, which can be a single part which is attached to the housing 11 or which can be a section of the housing 11. The housing 11 comprises a rim 27, which encircles the screw member 12. According to the embodiment shown in FIGS. 9 and 10, the screw member 12 is directly attached and integrally built with the shaft 10. When the screw member 12 is received in the housing 11 as shown in FIG. 10, the securing component 14" can be pressed onto the top of the screw member 12 in order to prohibit a rotary movement of the screw member 12 relative to the housing 11.

In order to lock the screw member 12, the securing component 14" comprises a crown with a disc body 25 for covering the screw member 12 on the one hand. On the other hand, the securing component 14" comprises prongs 26 formed at the outer circumference of the disc body 25. When the securing component 14" is attached to the screw member 12 for covering the screw member 12, at the same time, the prongs 26 snap behind the rim shape 27 formed directly at the housing 11. However, different from the embodiment shown in FIG. 11, the rim shape 27 might also be provided by a part which is built separate from, but connected to the housing 11. Further, it is not mandatory that the rim 27 comprises a groove into which the prongs 26 can snap in. Instead, it is also possible that—while pressing the securing component 14" onto the screw member 12—the prongs 26 are deflected inwards in radial direction such that an elastic force forces the prongs 26 towards the rim 27. Thus, at least when trying to remove the securing component 14", some kind of recesses are cut into the rim 27 by the upper edges of the prongs 26 due to the elastic force.

Moreover, the screw member 12 comprises a number of teeth 28 and the disc body 25 comprises a number of holes 29. When the securing component 14" is arranged for covering the screw member 12, the teeth 28 extend into the holes 29 for securing the screw member 12 against an unwanted rotation.

The present invention is not limited by the embodiment described above which is represented as an example only and can be modified in various ways within the scope of protection defined by the appending patent claims. In particular, the invention is not limited to the shown embodiments of the securing component 14, 14' and 14", and the securing component 14, 14', 14" can be designed in any other form.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An adjustment unit for the mechanical adjustment of a beam level of at least one light unit of a headlight for a vehicle, the adjustment unit comprising:
   at least one shaft; and
   a securing component,
   wherein the shaft is rotatably arranged at a housing of the headlight,
   wherein the shaft comprises or is coupled with a screw member which causes a rotary motion of the shaft about a shaft axis of the shaft in order to adjust the beam level of the at least one light unit,
   wherein the securing component prevents the screw member from an unwanted screwing,
   wherein the securing component is configured to interact with the screw member in a fully mounted position of the securing component in which the securing component is directly or indirectly attached to the housing,
   wherein the screw member is integral with or coupled with a first distal end of the shaft, such that both the screw member and the shaft rotate about the shaft axis,
   wherein the screw member comprises a wrench insert into which a wrench is insertable for rotating the screw member,
   wherein the wrench insert opens into a central cavity provided inside the screw member,
   wherein the securing component includes a holder extending from a bottom surface of the securing component and the screw member includes a counter holder provided inside of the central cavity, and
   wherein the holder of the securing component is inserted inside the central cavity of the screw member and engages with the counter holder of the screw member in the fully mounted position of the securing component.

2. The adjustment unit according to claim 1, wherein the securing component covers the screw member and/or comprises a securing section, which engages with the screw member in the fully mounted position of the securing component.

3. The adjustment unit according to claim 1, wherein the securing component engages with and directly contacts the wrench insert in the fully mounted position of the securing component.

4. The adjustment unit according to claim 1, wherein the securing component comprises a toothing engageable with a counter toothing that is provided directly or indirectly at the housing.

5. The adjustment unit according to claim 4, wherein a receiver is provided and is attached to the housing, wherein the counter toothing is integrally built from the receiver.

6. An adjustment unit for the mechanical adjustment of a beam level of at least one light unit of a headlight for a vehicle, the adjustment unit comprising:
   at least one shaft; and
   a securing component,
   wherein the shaft is rotatably arranged at a housing of the headlight,
   wherein the shaft comprises or is coupled with a screw member which causes a rotary motion of the shaft about a shaft axis of the shaft in order to adjust the beam level of the at least one light unit,
   wherein the securing component prevents the screw member from an unwanted screwing,
   wherein the securing component is configured to interact with the screw member in a mounted position of the securing component in which the securing component is directly or indirectly attached to the housing, and
   wherein the screw member is connected to the shaft via a coupler, wherein the securing component extends into or through a clearance hole of the coupler and engages with the shaft in the mounted position of the securing component.

7. The adjustment unit according to claim 6, wherein the securing component comprises:
   a cover section for covering the screw member; and
   a fastening arm for undetachably fastening the securing component to the housing.

8. An adjustment unit for the mechanical adjustment of a beam level of at least one light unit of a headlight for a vehicle, the adjustment unit comprising:
   at least one shaft; and
   a securing component,
   wherein the shaft is rotatably arranged at a housing of the headlight,
   wherein the shaft comprises or is coupled with a screw member which causes a rotary motion of the shaft about a shaft axis of the shaft in order to adjust the beam level of the at least one light unit,
   wherein the securing component prevents the screw member from an unwanted screwing,
   wherein the securing component is configured to interact with the screw member in a fully mounted position of the securing component in which the securing component is directly or indirectly attached to the housing,
   wherein the screw member is integral with or coupled with a first distal end of the shaft, such that both the screw member and the shaft rotate about the shaft axis, and
   wherein the securing component forms a crown with a disc body for covering the screw member and with prongs formed on an outer circumference of the disc body, wherein, in the fully mounted position of the securing component, the prongs are snapped behind a rim shape provided directly or indirectly at the housing.

9. The adjustment unit according to claim 8, wherein the screw member comprises a plurality of teeth and the disc body comprises a plurality of holes, and wherein, in the fully mounted position of the securing component, the teeth extend into the holes for securing the screw member against an unwanted rotation of the shaft.

10. A headlight for a vehicle comprising a housing, at least one light unit and an adjustment unit for the mechanical adjustment of the beam level of the at least one light unit, wherein the adjustment unit is configured as described in claim 1.

11. The adjustment unit according to claim 1, wherein the securing component covers and directly contacts a top surface of the screw member in the fully mounted position of the securing component.

* * * * *